Figure 1:
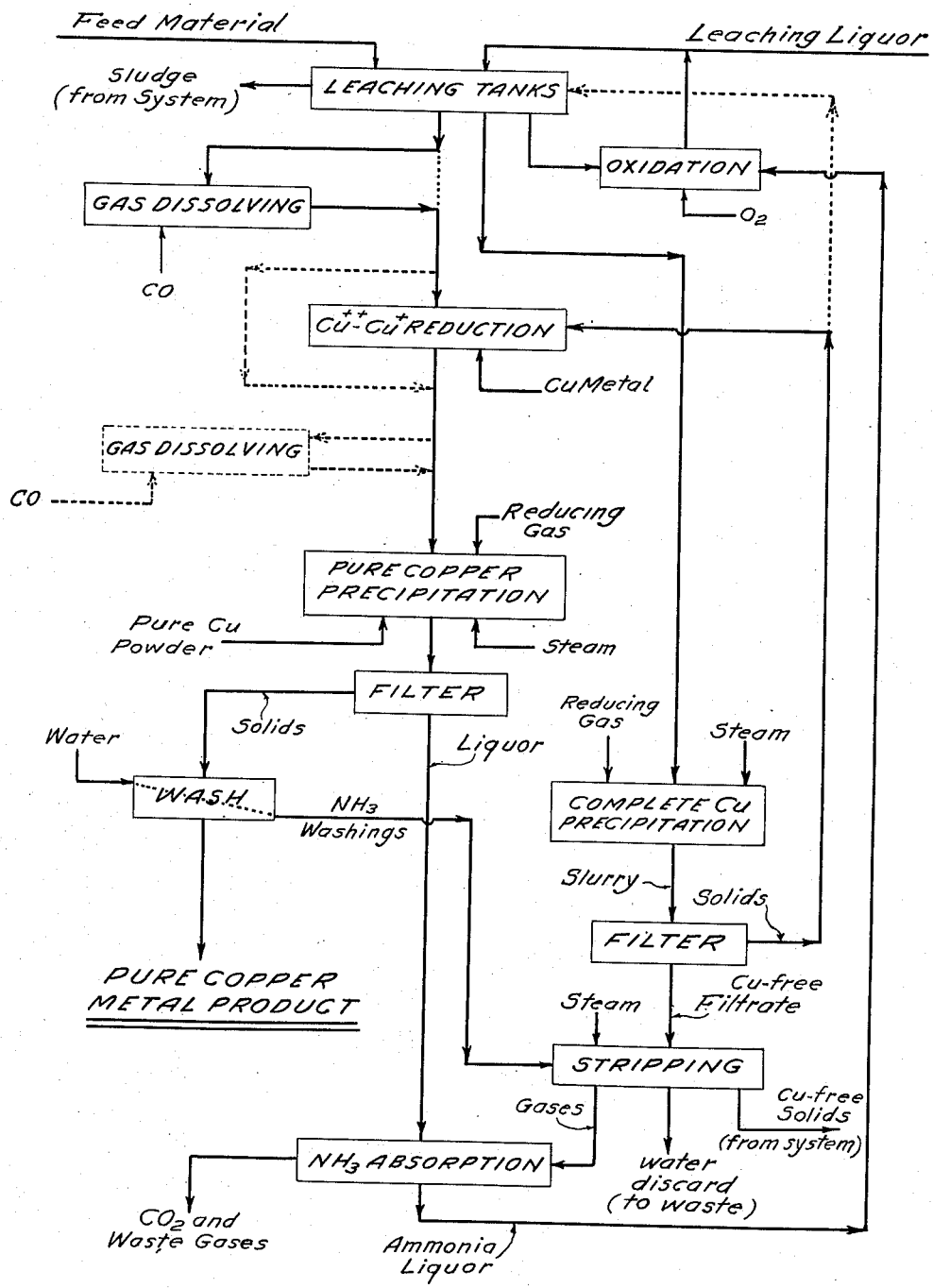

Patented Aug. 4, 1953

2,647,831

UNITED STATES PATENT OFFICE 2,647,831

PREPARATION OF PURE COPPER METAL FROM NONFERROUS METAL-BEARING SCRAP

Louis N. Allen, Jr., Short Hills, N. J., and Patrick J. McGauley, Glen Cove, and Edward S. Roberts, New York, N. Y., assignors to Chemical Construction Corporation, New York, N. Y., a corporation of Delaware Application December 14, 1950, Serial No. 200,794

10 Claims. (Cl. 75—103)

The present invention relates to the recovery of non-ferrous metals from ores, concentrates, blister, scrap metal and the like. In particular, it relates to an improved method whereby the non-ferrous metal content of such materials may be quickly, simply and easily leached and subsequently recovered. Still more specifically, it deals with the recovery of highly pure copper from various sources, including copper-bearing scrap and blister. As such, the present invention constitutes a continuation-in-part of our copending applications, Serial Nos. 133,666 and 165,524, filed December 17, 1949 and June 11, 1950, respectively.

In recent years, the metals trades have been faced with a constantly increasing demand for non-ferrous metals, particularly copper. This has been accompanied by a decrease in known reserves of high-grade ore and rapidly increasing costs of mining and refining the lower grades. As a result, more and more interest is being displayed in improved methods of producing such metals and for recovering the non-ferrous metals content of scrap metal. Since copper recovery is of great commercial interest, it will be taken as illustrative.

What is probably the best current practice in the field is readily illustrated. Copper-bearing scrap is charged into large leaching vats and flooded with a dilute, oxidized solution of ammoniacal copper carbonate. A flow of leach liquor, small relative to the total volume, is continuously drawn off, pumped through an oxidation tower and returned to the leaching tanks. Thus, copper in solution is alternately oxidized to cupric salts and then returned to the cuprous condition in dissolving more copper. Usually, new barren solution is regularly added to the system and pregnant solution withdrawn at about the same rate. Ammonium carbonate and ammonia are distilled off and the copper thus precipitated and recovered, principally as impure cuprous oxide. Mother liquor from the system is usually discarded. Ammonia and carbon dioxide vapors are condensed in water and reused in the leaching of more scrap.

Such procedures are not wholly satisfactory for several reasons. For example, as a result, not only copper but zinc and other soluble impurities are gradually dissolved into a relatively dilute solution, even though the solution rates of various metals is not necessarily the same. For example, copper and zinc dissolve at approximately the same rate. Nickel, however, will dissolve at a somewhat slower rate, depending on the nature of the source. Lead will dissolve, if at all, only to a low saturation level. In any case, the relatively dilute leaching solutions do dissolve much of the zinc and other impurities which are later precipitated as impurities in the copper oxide product from the still.

It will be seen that this process is extremely slow. Leaching of normal copper scrap with dilute solutions requires keeping scrap in the leaching tanks for periods of three and often six or more weeks. This unreasonably long leaching period requires such a large and expensive inventory of both metal and ammonia in process that the carrying charges become an important item in the total cost of processing. Further, the long leaching period requires an excessive number of leaching tanks and equipment to handle the necessary amount of solution. Adequate time is allowed not only for the copper but also any zinc and many other soluble metals to dissolve.

Other objections include the fact that copper and zinc oxides and carbonates precipitated in the still tend to build up on the inside of the vessel and must be periodically removed by hand labor. The high steam requirements of the still are an important part of the cost of the process. Further, the resulting impure copper product must be reduced and refined before it is readily marketable as commercial copper metal, which is usually required to be at least 99.9% pure. Lead and zinc impurities are distilled off during the reducing and refining operation. Nickel, however, remains in the copper and to remove it requires an expensive separation process. Therefore, the presence of nickel in substantial quantities markedly reduces the utility of the resulting impure oxides and carbonates.

It would seem fairly simple to increase the leaching rate. For example, it would appear to be both simple and desirable to increase the concentration of the leaching liquor. However, if this is done, the economy of still operation is radically altered and it is the economy of still operation which makes the use of dilute leaching solutions desirable. The increased cost of handling more concentrated solutions is such as to offset any economic gain in the shorter time required for leaching.

There remains, therefore, a commercial demand for a process, the utilization of which is not hampered by these and other drawbacks. It is, therefore, the principal object of the present invention to devise such a method, one which is faster, easier and more effective. Preferably, the method should involve neither the use of unusual or expensive apparatus nor the necessity for extraordinary or expensive reagents.

In accordance with the present invention, an overall process is provided, one which is capable of fulfilling these objectives. It involves a number of unusual features in a novel combination of leaching, precipitation, liquor-treating and recirculation procedures. In view of the simplicity of the essential individual features of the process, the highly successful results obtained with the combination are surprising. Particularly is this true in view of the long period over which such a process has been in demand.

Figure 2:
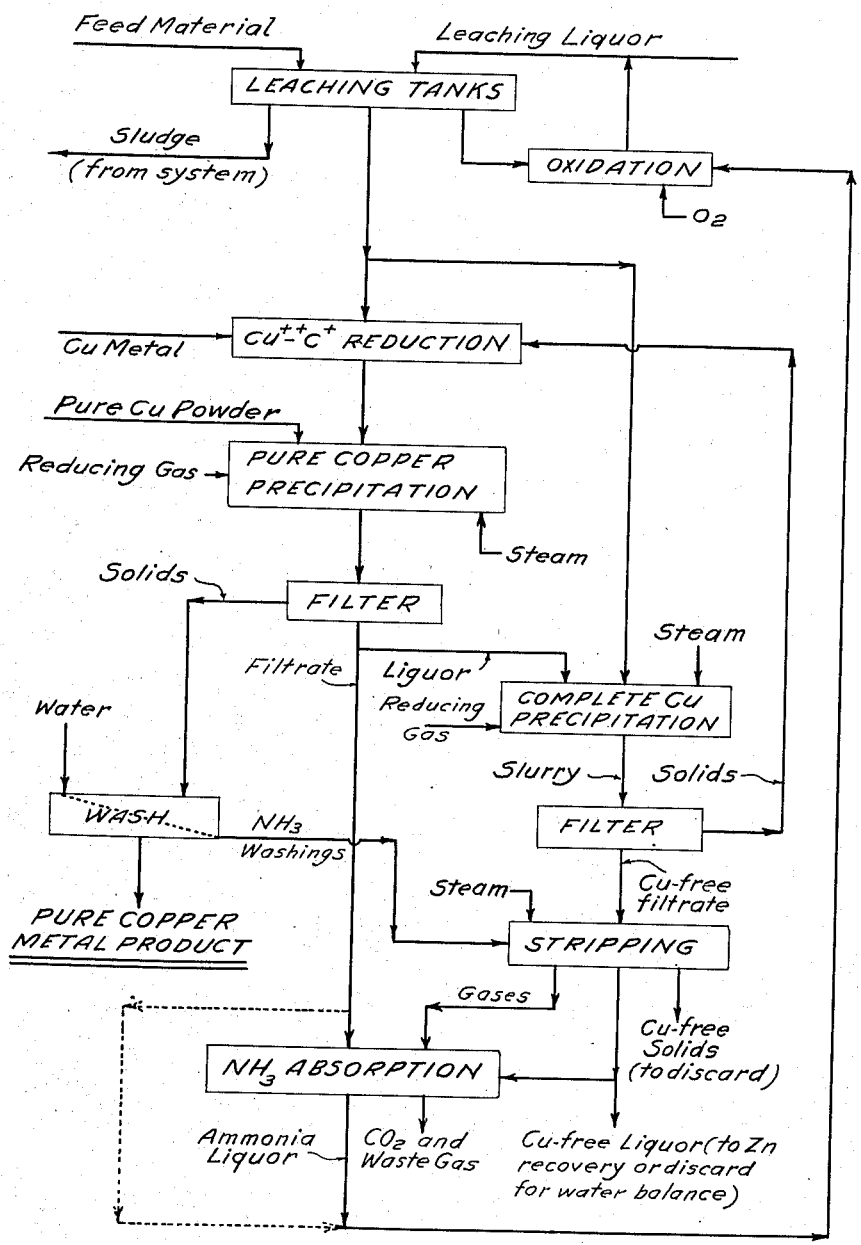
Figure 3:
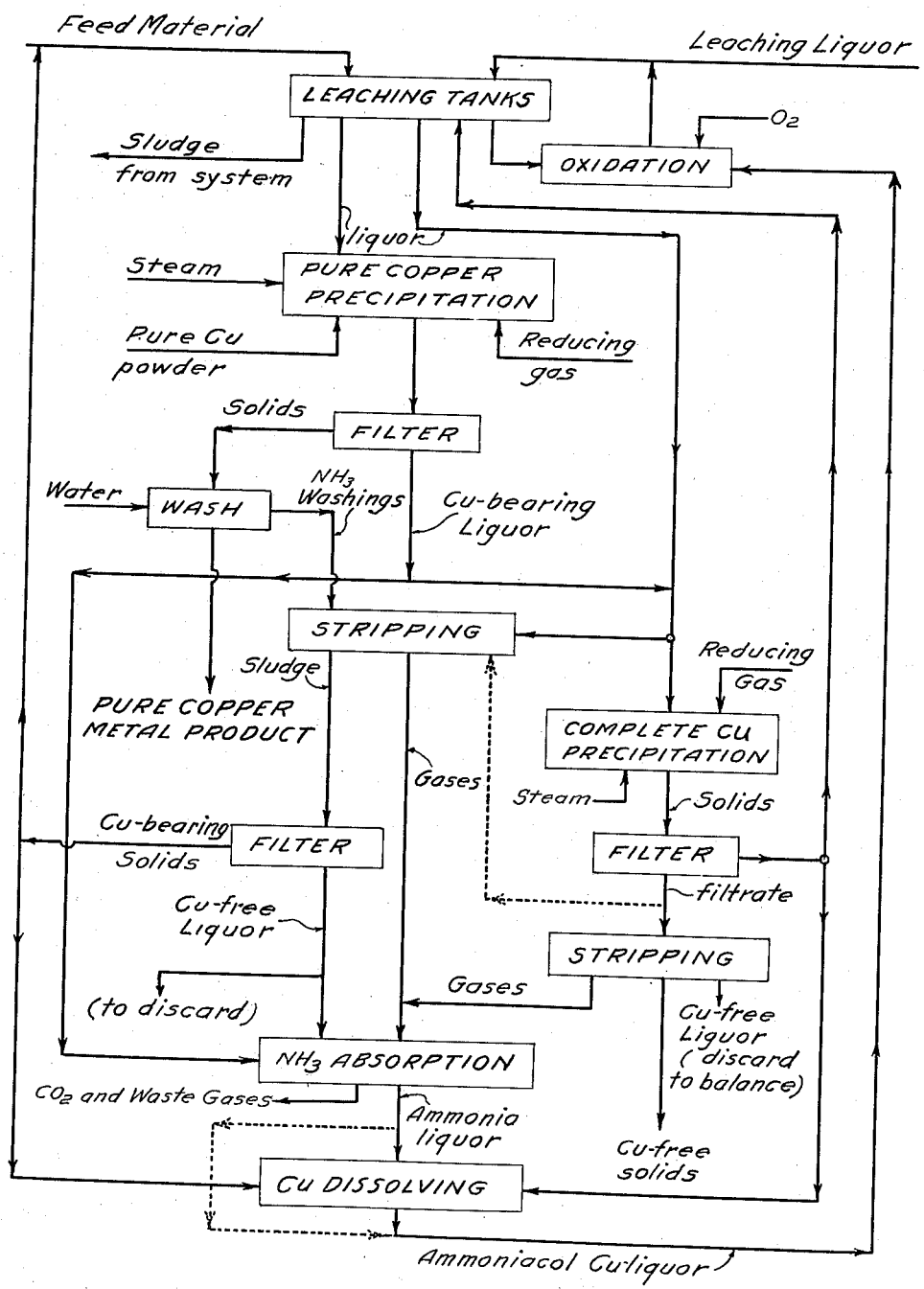

A discussion of the invention may be aided by reference to the accompanying drawings, in which Figure 1 is a flowsheet showing one modification of the process, Figure 2 is a flowsheet of a modification thereof, eliminating certain optional features and showing others, and Figure 3 shows a still further modification, suitable for use under suitable circumstances.

In any overall process such as that of the present invention, the initial step of leaching is of marked importance. One of the features of the overall process of the present invention is the preferred use of an improved leaching schedule for the ammoniacal copper carbonate liquors. This is a practice such as is disclosed and claimed in our above-noted copending application, Serial No. 133,666. As there brought out, a most desirable improvement is to circulate substantially the entire body of leaching liquor relative to the scrap mass. The resultant movement of liquor over the solids is very high compared to that produced by the normal liquor movements in the conventional practice.

According to that application, this rate of relative movement should be at least 0.01–0.05 feet per second over the scrap. On the other hand, too high a rate may involve an excessive power consumption. The circulation rate, therefore, ordinarily should not, but may, exceed about five feet per second. In most cases, it will not exceed about 0.50–1.0 foot per second. It has been found that the leaching rate increases almost directly, within the preferred operating range, with the one-third power of the velocity over the metal surface.

Actual operation at the preferred circulating rates will be conducted using a number of tanks. Solution is recirculated within each tank to obtain the desired velocity. The gross quantity of copper being leached per unit of time within a given tank gradually diminishes as the available copper surfaces decreases. Accordingly, it is desirable to use the plurality of tanks, all operating simultaneously but each at a different stage in the leaching operation. In this way, a substantially constant overall rate of leaching may be maintained.

Several additional factors which affect the leaching rates should also be considered. The rate increases as the temperature is increased. Accordingly, the temperature of operation should be as high as practicable without seriously reducing the solubility of the ammonia. However, most, if not all, of the recycled leach liquor will pass through an oxidation tower and, in general, no particular attempt should be made to actually increase the leaching temperature above the effluent temperature from the oxidation step. This usually will range from about 100°–135° F. However, precautions should be taken to avoid heat loss in the oxidation and leaching systems to maintain as high reaction rates as practicable.

As brought out in our above-noted applications, the leaching rate is also affected by, and over a considerable range is directly proportional to, the amount of cupric copper available in the leaching liquor. This may be varied considerably. It has been found preferable to use a leach liquor initially containing at least 20 but not more than about 100–110 grams of cupric copper per liter.

In accordance with the present invention, it is not necessary that the leaching solution be dilute. It is an advantage of the present system that it is in no way limited to that economy of the still operation which in the previous practice favored dilute leaching solutions. In fact, the use of concentrated leaching solutions is not only possible but highly desirable for best metallurgical results. The copper concentration of the effluent leach liquor, therefore, will ordinarily be kept as high as conveniently practicable, for reasons which will be more fully discussed below. However, copper, copper salts, or other impurities should not be precipitated in the system at any point except in the reduction vessels where metallic copper is precipitated. This copper figure may go to about 175–200 grams per liter, or even higher, during operation. In general practice, however, the upper copper limits will be reduced somewhat when, as in treating brass scrap, appreciably large quantities of zinc are being leached out along with the copper. In any case, the higher the copper content of the liquor eventually taken to the reduction step, the better the results, not only economically but in the physical condition of the product.

The present overall process may be roughly divided into three general operations: the leaching, the separating of copper from the pregnant liquor and the system for reforming and recirculating leach liquors. The principal precautions and desirable limitations with regard to the actual leaching step have been discussed. The remainder of the procedure, for the purpose of illustration, may be considered as constituting a series of separate but interlocking steps.

Initially, typical operations will be described with reference to the treatment of copper scrap which is essentially free from large amounts of impurities, usually 90% copper or higher. Necessary deviations from this system caused by the dissolution in and the necessity for removing from the leach liquors dissolved metals other than copper then will be discussed.

In some cases it may be desirable, before copper metal precipitation of the copper metal product, to reduce some or all of the cupric content of this portion of the liquor to the cuprous condition. In accordance with the present invention, this has been found not to be a necessary limitation in all cases. However, in many cases it is found an aid to insuring a more uniformly high-grade copper powder as the final product.

Our preferred method for this cupric-cuprous reduction is the use of metallic copper. Pregnant leach liquor is taken through a bed containing metallic copper, usually in large excess. Copper metal for this purpose need not be pure but should be of high grade. If suitable high-grade scrap, blister copper, or the like is available, this may be used for an additional amount of leaching that can be accomplished.

As will be shown below, in addition to a copper powder product of 99.9% or higher purity, considerable amounts of copper of lower purity, but of grade much higher than the original feed, may be produced in any one operating cycle. This cupric-cuprous reduction operation is probably the most desirable as well as convenient point for adding this lower grade copper product back into the system for further purification to the 99.9% or higher purity grade which is commercially necessary. When the cupric-cuprous reduction is unnecessary or undesirable, this reduction may be omitted and the lower grade product returned directly to the leaching tanks.

It may be desirable, as pointed out in our above-noted applications, to dissolve a reducing gas in this portion of liquor, prior to the actual precipitation of product copper metal therefrom. This may be done before of after treatment with metallic copper for the cupric-cuprous reduction. If done, it is usually before, since in some cases this seems to aid in the copper leaching action and thus assist the cupric-cuprous reduction just discussed. It is shown both ways in Figure 1, by means of the optional dotted flow lines. Usually the amount dissolved will be enough to saturate the liquor at the operating conditions.

Because of solubility limitations, the only practical gas is carbon monoxide. This gas pre-dissolving constitutes one method of introducing into the circuit reducing gas for the product copper metal precipitation. It also provides one method of predetermining the amount of reducing gas available to carry out the subsequent copper metal precipitation and thereby control the extent to which copper is precipitated in a particular reduction cycle.

As a source of carbon monoxide, various available commercial gases may be used. Sulfur is undesirable therein and should be avoided. Carbon dioxide or nitrogen, present as diluents, have no adverse effect except for the necessary increase in the volumes handled and the resulting decrease in the partial pressure of the reducing agent and the necessity for purging them later on. Producer gas, except for its possible sulfur content, which, if too high, may be reduced or removed by known methods, is satisfactory. Its use will be taken as illustrative. Other useful, commercially-available, suitable gases include water gas, reformed methane and the like. Frequently, too, off-gases are available from other operations which contain a useful content of carbon monoxide.

Not only producer gas but various other useful off-gases which may be produced in other operations about the plant contain high proportions of constituents other than carbon monoxide. The problem of separating the latter therefrom for use as the reducing gas is readily solved by the gas predissolving step just discussed. The carbon monoxide content is thus obtained for use without the necessity for providing for purging of insoluble or inactive gases from the main circuit. This is of advantage not only in simplifying the apparatus but also in preventing ammonia losses associated with the purging.

Under good operating conditions, the gas-saturated liquor can be made to contain cuprous copper, cupric copper, carbon monoxide and water in the correct mol ratio to precipitate about 70% of the copper content. While not an essential limitation, this degree of precipitation does constitute good average practice. The total copper content as well as the cuprous-cupric ratio will depend on whether the solution has been taken through a cupric-cuprous reduction with copper metal before or after the gas saturation. It will be found, as discussed below, that this amount of precipitation is a good average practice for producing the highly-pure copper product. While this is a useful practice, it is limited. It requires cooling the pregnant liquor to a suitable temperature for gas absorption. Further, it is essentially limited to the use of carbon monoxide. It is not necessary, according to the present application, to predissolve any gas in the pregnant leach liquor. In fact, precipitation of pure copper in a desirable powder form, uniform in grain size and with minimum tendency toward either metal foil formation or to "plating" on the apparatus appears to be favored if the leach liquor, with or without a cupric-cuprous reduction, is passed directly to the precipitating vessel. Gas saturation may be carried out therein, either before or during metal precipitation. This practice also requires less apparatus.

Further, as compared with the pre-saturation process, in the combined saturation-precipitation practice, almost any sulfur-free reducing gas may be used. Hydrogen, which is present to several percent in the producer gas noted above as a source of carbon monoxide, is to be preferred where the latter is not readily available or desirable to use. Of course, a mixture comprising carbon monoxide and hydrogen may be used. Hydrogen has the added advantage that in substantially pure form it is more readily obtainable. This permits simplifying the system.

In general, therefore, this combined saturation-precipitation process of the present application has many advantages and, therefore, it is to be preferred, particularly where a source of hydrogen is available. Best results are obtained in this procedure, for example, if the leach liquor is not cooled, a desirable step in our presaturation process. In fact, it is a feature of the present application that the leach liquor should be preheated, preferably to approximately the temperature at which the precipitation of the metal powder is to be carried out. This temperature itself is dependent on several factors, one of which is the nature of the reducing gas used. Copper precipitation appears to be more rapid at lower temperature levels when using carbon monoxide as the principal reducing gas than when using hydrogen.

Precipitation is accomplished by transferring the liquor to a suitable pressure vessel, with or without a prior cupric-cuprous reduction with copper metal. As noted, it is preferably preheated. Precipitation is done by heating, usually with steam, to above about 250° F. in the presence of atmosphere comprising the reducing gas or gases. Usually about 300°–400° F. for carbon monoxide and about 350°–500° F. for hydrogen will be found a good average practice without an excessive time cycle. The time of treatment obviously will vary with the temperature. Higher temperatures may be used if so desired. However, to do so is not necessary and will ordinarily be found to unduly increase the apparatus requirements for handling the increased equivalent pressures without the resultant gain being commensurate with the cost. Preferably, also, the pressure vessel should be equipped for mechanical stirring, which will markedly improve the rate of reaction.

Another novel feature of the present invention is the preferred use of pure copper powder, present in the reduction vessel in contact with the solution prior to the establishment of and during the actual reducing conditions. While the exact method by which this powder produces the effect is not clear, it does assist in making the product copper form in a highly satisfactory physical condition. This is true not only as to size but also as to freedom from liquor and other impurities. It also substantially reduces any tendency to foil formation or "plating" out on the apparatus. This result is also favored by a high total copper content in the liquor to be treated.

Since this added powder will be mixed with the product, it should be of the necessary pure grade. It may be retained from a previous processing cycle in batch operation. In continuous operation, it is retained by not completely discharging all of the product slurry at any one time. It is desirable that it be used whether there has been a previous cupric-cuprous reduction or not. Hence, the latter step is essential only to the extent necessary to provide a good point to recycle the lower grades of copper powder, the production of which will be noted below. Accordingly, in Figure 1 the cupric-cuprous reduction has been shown as being capable of being optionally by-passed.

One function of the powder appears to be to decrease the buoyancy of gas bubbles through the liquid phase. There should be at least enough to produce this effect during initiation of metal precipitation. For this reason, the only upper limit on the amount used is simply that of mechanical handling. No fixed numerical limits can be set. Within the mechanical limits of the apparatus this amount should be as large as possible. Obviously, in continuous operation the amount can be initially larger than is possible in batch operation.

In using the pre-saturation treatment procedure, as noted above, only about 70% of the copper ordinarily will be initially precipitated. In general practice, this will be product copper powder of the acceptable plus 99.9% grade. If precipitation is carried above about 70%, the grade decreases more and more markedly as 100% precipitation is approached. A limit of 70% or even 80% may be successfully exceeded, in many cases, in the present process without loss of acceptable purity, particularly when copper is the principal dissolved non-ferrous metal. However, it is still good practice to operate at about 70% precipitation, in most cases, to allow for variations in operating conditions. No definite numerical limit can be set to cover all cases.

Another novel feature in using the combined gas-dissolving and precipitating technique lies in the flexibility it provides in control of the degree to which metal precipitation is carried by controlling the temperature and/or time of treatment. The preferred temperature ranges given above for copper powder precipitation are for producing complete precipitation. The extent to which precipitation is carried can be limited by controlling the amount of available reducing gas. On the other hand, when excess gas is present, as is normal in the combined saturation-precipitation process of the present invention, these maximum temperatures should be reduced some 30°–70° F. to insure incomplete precipitation. The operating temperature can be regulated by control of the extent of heating and/or by the bleeding of steam and waste gases to control the pressure and hence the equivalent temperature. The time cycle must be adjusted for the particular temperature range used.

Precipitation of copper preferably should be accomplished in a continuous fashion for the various reasons noted. Steam and pregnant liquor may be continually added to the vessel and copper powder slurry continually discharged. Whether in continuous or batch operation, effluent slurry should be indirectly cooled to about 150°–175° F. and the pressure thereon reduced to atmospheric. In temperature range, the vapor pressure of the liquid will be about atmospheric and this constitutes a preferred practice.

Metallic copper is separated from this slurry, then washed and dried. Preferably, this is done using successive washings with ammonia-bearing liquor water, with a metallic-lead-dissolving reagent, with a metallic-nickel-dissolving reagent and finally with water. Wet copper metal powder is mechanically dried to the extent found practical, followed by complete drying in a reducing atmosphere, usually with heating to about 400° F. The product is pure copper metal powder containing 99.9%+ copper.

Decanted liquid or filtrate after removal of the product powder will contain ammonia and considerable residual dissolved copper. It usually is combined with the first metal wash liquor which also will contain ammonia and, in some cases, copper. These liquors are treated (a) to adjust the $CO_2$ content, (b) to remove water from the circuit to the extent required to balance the incoming materials to the overall process and (c) to recycle their copper content. These results may be accomplished in any of several ways. When copper is substantially the only dissolved metal, the only case thus far discussed, this may be done by an operation which comprises one of the novel features of the process of our application, Serial No. 133,666.

The procedure shown therein is useful in such cases because the amount of residual dissolved copper and other metals after pure copper precipitation is often small and the liquor could be recycled directly in many cases. However, water must be discharged to balance the input. Accordingly, all or a part of the filtrate from the pure copper collecting step, usually approximately one third, is treated to strip any dissolved ammonia and other gases therefrom. Stripping also results in precipitating any dissolved copper in that portion, usually as impure copper containing cuprous oxide or carbonates.

Stripping is preferably carried out in a suitable tower, at about atmospheric pressure, with live steam. Evolution of $CO_2$ and $NH_3$ and the noted copper precipitation results. Ammonia is redissolved and recycled. The stripped effluent is then filtered. All or a part of the stripped liquor constitutes the necessary water to be discarded. The precipitated solids, including the copper, are recycled. They may be sent directly to the leach tank. They also may be taken up by being redissolved in the reabsorbed ammonia liquor. In the latter case, this liquor can be recycled as leach liquor, preferably after passing through an oxidation tower.

Any undiscarded stripped liquor may be used in absorption of the stripped gases. If so desired, however, stripped gas can be redissolved directly in a fraction of the decanted liquid or filtrate without stripping or precipitating the copper therefrom. In that case, if so desired, all or only a part of the liquor not used for gas absorption will constitute the fraction which is stripped. The amount stripped is selected to provide the necessary water and impurities discarded from the system.

The portion of the fluid, that used for absorption of stripped $NH_3$, is preferably cooled to below about 90° F. It is passed through a packed tower, or a mechanical equivalent, countercurrently to a stream of the stripped gases. Substantially all of the $NH_3$ is dissolved. Absorption rates for $CO_2$ and $NH_3$ differ sufficiently so that 95% of the ammonia can be dissolved, while dissolving only about 10% of the carbon dioxide. The undissolved gases should be treated also with cold water to pick up any remaining $NH_3$, even though with an additional small portion of $CO_2$. However, the overall result is the evolution of sufficiently more $CO_2$ in the stripper than is redissolved so as to deliver the necessary amount of $CO_2$, to be removed from the overall system.

In many cases, the correct amount of water to balance the cycle can be discharged from the complete precipitate or stripper filter. If more water must be discharged, additional $CO_2$ must also be evolved in the final cold water scrubber. Sufficient $CO_2$ must be retained to maintain the desired carbonate level. However, if too much is evolved in the scrubber, the requisite amount may be added back at any convenient point; for example, in the oxidizing tower. Conversely, if more $CO_2$ need be evolved, additional water may be discarded through the filter and the make-up water returned at any convenient subsequent point.

Discharge from the ammonia absorption operation usually will be found to be at about 140°–145° F. This is the fluid which may be returned directly to leaching or be first used to redissolve the stripped copper-copper oxides precipitate. As was noted above, the copper oxides or carbonates now constitute a major part of the solids in the sludge from the filter used after the stripping step. To simplify the drawing, this filter, or an equivalent decanting tank, being conventional, has been omitted.

Leach liquor which is to be returned to the leaching or dissolving tanks, therefore, will be made up of (a) spent leach solution and (b) the return ammonia liquor, usually containing copper, obtained after the $H_2O$–$CO_2$ adjustment operation just discussed. These two liquors, whether commingled or not, are subjected to oxidation. Again, it is desirable to operate below about 90° F. to favorably influence the absorption rates. Cooled liquors are passed through a suitable oxidizer, usually a packed tower, countercurrently to a stream of air, oxygen, or oxygen-enriched air. Some ammonia will be driven off. This is again redissolved in cold water in a separate operation and is added to the oxidized liquid effluent.

While the foregoing discussion has been principally concerned with leach liquors containing principally copper, not all scrap metals requiring treatment constitute pure copper. Some is copper clad steel. This presents no difficulty, as the iron is unreacted by the copper ammonium carbonate solution. Brass has a high zinc content. Zinc, for example, will form zinc carbonate which is soluble in ammonia leach solutions during leaching. Zinc, then, will build up to some concentration determined by input and output. Other scraps may contain zinc, lead, tin, or nickel and other such metals.

Where additional metals are dissolved to any extent, some provision must be made for their elimination. Otherwise, they will build up in the circuit to concentrations adverse to good operation. Where it is necessary to remove zinc and/or other like dissolved metals a modification of the flow is necessary. Probably, the most convenient method of removing zinc carbonate and/or other non-ferrous metal salts is to divide the flows before the partial but pure copper precipitation. This may be an actual division of that flow or one separately withdrawn for the purpose. If so desired, all or part of the liquor remaining after the partial precipitation of the pure copper product may be added to this circuit. Ordinarily, however, this need not and usually will not be done.

In any case, a portion of leach liquor is subjected to a complete copper precipitation with reducing gas, regardless of copper purity. This precipitate is recycled, preferably as noted above, to a cupric-cuprous reduction. Precipitation is preferably done exactly as that discussed above, except that it is carried out to completion. Heating should continue for a considerably longer period of time and, also as noted, usually to a temperature of about 30°–70° F. above that normally used for the step of precipitating only so much copper as comes down pure.

It has been found by actual practice that the last copper fractions which precipitate during total copper reduction are less pure than about the first 70% which precipitates. Therefore, in this purging side circuit, all of the copper precipitating between 0% and 100%, together with any precipitating between about 70% and 100%, if a part of the partially precipitated liquor is added thereto, is separated from the zinc removal liquor flow and turned back to leaching. Most of the zinc carbonate remains in solution along with carbon dioxide and ammonia. By removing this liquor it is thereby removed from the copper circuit. Usually a continuous flow through this purging side circuit is maintained.

The copper from zinc-liquor separation is accomplished by first cooling the slurry of metallic copper and copper-free liquor and then relieving the liquor to atmospheric pressure. Copper may be filtered out or the mixture may be allowed to settle. Clear liquor containing zinc carbonate, $CO_2$ and ammonia is readily decanted. Decanted liquor, or filtrate, is processed in a stripping still to recover $NH_3$ in a similar manner to that described previously.

The effluent from this still will contain zinc oxides and/or carbonates and water. If so desired, zinc salts may be separated out by conventional methods. In this way, some or all water required for discard may be obtained. Ammonia is taken up in a flow returning to leaching, preferably in liquor remaining after the 70% reduction. Liquor obtained in the 100% reduction, or even stripped liquor or water, may be used, as shown.

Alternatively to, or concurrently with, the complete reduction or precipitation using a reducing gas, part or all of the 100% copper precipitation may be done, as noted in our above-noted application, Serial No. 133,666, by boiling to strip off gases. Driving off these gases precipitates the copper, largely as oxides or carbonates. These latter can can be recycled to leaching. Such a procedure, combining complete copper precipitation with ammonia stripping, is most useful when there is but little content of diluent metals. Its great disadvantage is the tendency, in driving of ammonia to precipitate all copper, to precipitate some zinc oxides and the like. If carried too far, solid residues may collect on the apparatus and are hard to remove. For this reason, a parallel flow, such as in Figure 3, is desirable.

During leaching some lead may dissolve as lead carbonate, soluble in ammonia. The balance remains in a sludge in the leaching tanks, along with any tin, rare metals and the like. They may be recovered, if so desired, in a separate circuit. Some dissolved lead may be reduced with the copper. Proportionately, it precipitates much slower than copper and ordinarily will not all come down. If precipitated, it may be removed by a suitable reagent, such as a soluble ferricyanide in solution with an acid which forms soluble lead salts, acetic acid, or a soluble acetate and an oxidizing reagent.

Nickel and/or cobalt may also dissolve to some extent in the treatment of some types of scrap. If so, they will be proportionately reduced. Like the lead, they may be washed from the copper. This can be readily accomplished by a weak sulfuric acid wash. Since the latter is ordinarily used to stabilize the copper product against oxidation if for no other reason, this will be taken care of by normal operation.

In the process of the present invention, any difficulty occasioned by nickel, cobalt and the like in the scrap is also considerably reduced at the normal operation temperature. This applies to both leaching and copper metal production. In the present process, both the leaching and the copper precipitation temperatures are well below the optimum conditions for nickel and cobalt. Operating conditions are ordinarily such that all the copper will be leached before all the nickel or cobalt can be dissolved, except when present in very small amounts proportionately to the copper. Therefore, a part of the feed content of these metals will also remain in the leached sludge.

While a major portion of the foregoing discussion has been primarily concerned with copper recovery, it is to be noted that zinc, nickel, cobalt and the like can be recovered by similar methods to the extent that they are present in the scrap. It is also apparent that scrap metal is not necessarily the only utilizable feed material. Any low grade product of the desired metal can be treated as well as, to a certain extent, concentrates from ores of oxidized minerals of these metals.

In the foregoing discussion and in the appended claims the expressions "dissolved ammonia," "available metal" or "available copper" have been used. In connection therewith the following facts should be noted. The term "dissolved ammonia" is used to designate that ammonia which is in solution as such, as ammonium hydroxide and as combined with dissolved metal to form complex metal ammonia ions. The terms "available metal" or "available copper" are used synonymously with "dissolved metal" or "dissolved copper" to indicate the dissolved metal content regardless of its particular form.

We claim:

1. In a cyclic process of recovering an ammoniacal liquor-soluble non-ferrous metal as powder of high purity from an aqueous ammoniacal metal salt liquor, containing said metal and other metals, the improvement which comprises: at superatmospheric pressure and at above about 250° F., subjecting a portion of said liquor to chemical reduction with a sulfur-free reducing gas, maintaining the reducing conditions only for sufficient time to reduce not more than so much of the desired metal as will precipitate as powder of high purity, collecting so-precipitated metal as product; separately subjecting a portion of leach liquor to similar reducing conditions at a temperature and for a time sufficient to obtain a less pure precipitate comprising substantially the entire dissolved content of said desired metal, separating said less pure precipitate from residual liquor, and returning collected less-pure precipitate for retreatment in a later cycle, at least a part of said other metal content in the residual liquor being removed from the circuit in each cycle.

2. In a cyclic process of recovering copper of high purity from an aqueous ammoniacal copper salt liquor containing other metals, the improvement which comprises: at superatmospheric pressure and at above 250° F., subjecting a portion of said liquor to chemical reduction with a sulfur-free reducing gas, maintaining the reducing conditions only for sufficient time to reduce not more than so much dissolved copper as will precipitate as powder having at least 99.9% purity and collecting precipitated copper as product; separately subjecting a portion of leach liquor to similar reducing conditions at a temperature and for a time sufficient to obtain a less pure copper precipitate comprising substantially the entire dissolved copper content of said portion, separating so-precipitated less-pure copper from residual liquor, returning separated less-pure copper precipitate for retreatment in a later cycle, and removing at least a part of said other metals content of said residual liquor from the circuit in each cycle.

3. A process according to claim 2 in which said portion subjected to substantially complete copper precipitation comprises liquor previously subjected to said partial precipitation of copper of at least 99.9% purity.

4. A process according to claim 2 in which said portion subjected to substantially complete copper precipitation comprises a mixture of liquor previously subjected to said partial precipitation of copper of at least 99.9% purity and a separate portion of said aqueous ammoniacal copper salt liquor.

5. A process according to claim 2 in which carbon monoxide constitutes the principal available reducing gas and reduction is carried out at from about 250°–370° F., for said partial precipitation and at from about 300°–400° F., for said substantially complete precipitation.

6. A process according to claim 2 in which hydrogen constitutes the principal available reducing gas and reduction is carried out at from about 250°–470° F., for said partial precipitation, and from about 350°–500° F., for said substantially complete precipitation.

7. A process according to claim 2 in which at least a part of said substantially complete precipitation of copper is accomplished by distilling off dissolved ammonia.

8. In a cyclic process of recovering copper of high purity from solid copper-bearing material containing contaminants by a process in which said material is leached with an aqueous ammoniacal copper salt liquor, the improvement which comprises: at superatmospheric pressure at above about 250° F., subjecting a portion of said liquor to chemical reduction with a sulfur-free reducing gas, maintaining the reducing conditions for sufficient time to precipitate substantially the entire content of dissolved copper in said portion; separating so-precipitated copper from residual liquor, substantially stripping at least a part of the substantially copper-free residual liquor of its dissolved ammonia content, discarding at least a part of the substantially ammonia-free liquor, whereby contaminants are removed from the circuit; absorbing stripped ammonia and recycling absorbed ammonia and any precipitated copper of less than 99.9% purity.

9. A process according to claim 8 in which at least a part of the liquor subjected to copper precipitation is first treated by maintaining reducing conditions for only sufficient time to precipitate copper of not less than 99.9% purity and so-precipitated copper is separated and collected as product prior to treating residual liquor to complete precipitation of residual dissolved copper therein and at least a part of the stripped ammonia is absorbed in copper-bearing liquor which has been subjected to said partial but pure copper precipitation.

10. In recovering copper of high purity from an aqueous ammoniacal copper salt solution wherein copper is chemically precipitated from said solution at superatmospheric temperature and pressure with a sulfur-free reducing gas: the combination therewith of the improvement which consists in initiating the precipitation by reduction with said gas of said high purity copper metal from said solution in the presence of copper metal powder of a purity of at least 99.9%.

LOUIS N. ALLEN, Jr.
PATRICK J. McGAULEY.
EDWARD S. ROBERTS.

References Cited in the file of this patent

UNITED STATES PATENTS

| Number | Name | Date |
|---|---|---|
| 1,686,391 | Muller et al. | Oct. 2, 1928 |

OTHER REFERENCES

"A Comprehensive Treatise on Inorganic and Theoretical Chemistry," by Mellor, published by Longmans, Green and Co. (1923), vol. 3, page 158.